Aug. 27, 1946.  J. MRAZEK  2,406,705
METHOD OF MARKING BODIES
Filed Sept. 30, 1944
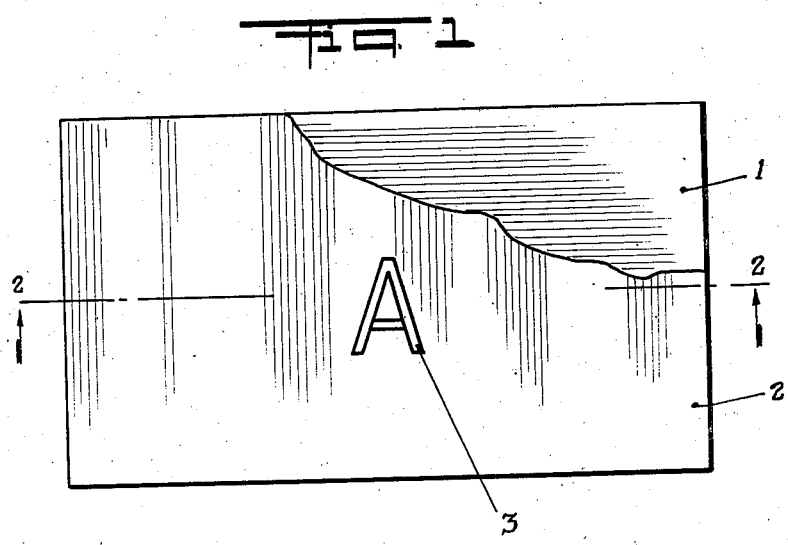
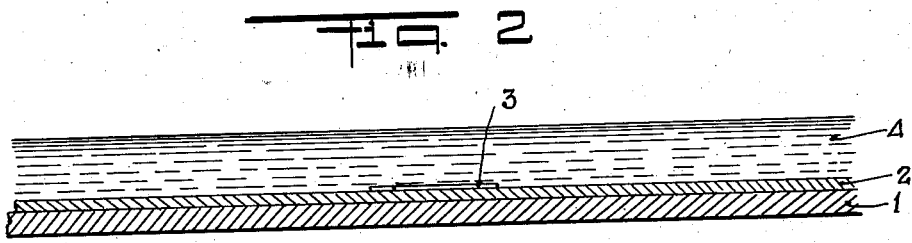
INVENTOR.
Joseph Mrazek
BY
Mock & Blum
ATTORNEYS Patented Aug. 27, 1946

2,406,705

UNITED STATES PATENT OFFICE 2,406,705

METHOD OF MARKING BODIES

Joseph Mrazek, Woodside, Long Island, N. Y.

Application September 30, 1944, Serial No. 556,673

3 Claims. (Cl. 18—61)

This invention relates to a new and improved method of marking bodies.

The invention relates particularly to the marking of self-supporting thin transparent films.

Such films may be made of any material, which can comprise a single ingredient, or a plurality of ingredients.

Without limiting the invention to any particular material, and as examples of some of the materials which I can use in the film-forming mass, I refer to cellulose, cellulose hydrate, cellulose acetate, cellulose acetate butyrate, cellulose nitrate, cellulose nitrate acetate, ethyl cellulose and other cellulose ethers, rubber, rubber hydrochloride, proteins such as gelatin and casein, polymers such as polyvinyl alcohol, polyvinyl alcohol acetate, polyvinyl chloride, polyvinyl butyral, polystyrol, methyl methacrylate and other acrylic resins, etc.

One of the well-known methods of making such films is to deposit the film-forming mass on a perfectly smooth casting surface, to harden or set the film-forming mass while it is in contact with said casting surface, and then to strip the set mass from said casting surface. The casting surfaces now used are metal belts, metal wheels, coated rubber belts, glass sheets, etc. Heavy sheets are made by molding blocks and then slicing the molded blocks.

The invention is further illustrated by the annexed diagrammatic drawing.

Fig. 1 is a top plan view which shows a sheet of paper 1, which has a clay coating 2, on which a marking 3 has been printed. Part of the representation of the clay coating 2 has been omitted, in order to show the paper 1.

Fig. 2 is a horizonal sectional view on the line 2—2 of Fig. 1, which shows a mass 4 of film-forming material applied to the marked casting layer 2.

According to my invention, I print a pre-formed marking on the casting surface. This marking can consist of pictures, words, etc. This marking is printed with any suitable marking material or ink. The casting surface on which said pre-formed printing is made, can be the free or exposed surface of a clay coating of a high-grade, well-sized sheet of paper, of the type which is used for printing books and high-grade periodicals. Such paper can be very flexible, or sufficiently thick to have any desired degree of rigidity. The exposed clay surface should be smooth. When such printed marking is dry, the ink is located substantially wholly on the free surface of said clay coating or close thereto. The film-forming mass includes a solvent which can dissolve said ink, save possibly for the insoluble pigment coloring matter thereof. The coloring matter of said ink can be a dye or dyes which are soluble in said solvent. The pre-formed marking can be mono-color or multi-color. Said pre-formed marking can be printed on the clay coating by any suitable method or machine.

When the film-forming mass is thus applied to the pre-formed printed marking, said solvent of the film-forming mass, which is uniformly intermixed with the other ingredient or ingredients of the film-forming mass, dissolves and transfers said pre-formed printed marking into the interior of the film-forming mass, without bleeding or other distortion of said pre-formed marking. For this purpose, the film-forming mass is made of suitable consistency, with a suitable concentration of its dissolved or dispersed ingredient or ingredients. The film-forming mass is then allowed to set or harden, and it is then stripped from said clay casting surface. I can thus use any known type of casting device or casting machine, in which the paper carrier is affixed to the belt, wheel, or other casting device. The invention applies to making bodies of any thickness or bendability or permeability to light. The bodies may be translucent or even opaque, and of any degree of rigidity. The method of forming and setting the finished body from its starting material, will depend upon its composition and thickness, and in this respect, I can use the well-known methods of making such bodies, save that I transfer a pre-formed printed marking into the interior of the set body.

By making the body in the form of a thin and transparent film, which is preferably very flexible, the incorporated marking is equally visible at both surfaces of said film. The invention is particularly useful in making labels, maps, charts, inserts for books and periodicals, advertisements, etc. Since the film can be made of water-proof material such as water-proof "Cellophane," water-proof resins and other plastics, etc., the finished bodies can be resistant to water.

The ink can be made of any ingredient which is preferably compatible with the material of the marked body. Without limiting the invention to any particular type of ink, it can be of the type disclosed in U. S. Patent No. 2,087,190, in which the marking material consists of cellulosic material and a resin or resins. Such ink need not contain coloring matter, if a mono-color marking is required, because the opacity of the transferred marking will furnish the necessary contrast with the transparent body of a film. Such ink can include a coloring pigment or a coloring dye. The transferred marking is preferably, but not necessarily, wholly located in the interior of the set film or other set body.

The preferred film-forming materials which I use in the film-forming mass, are ethyl cellulose and cellulose acetate.

Some of the other details of my invention are stated in the following examples, which state formulas for respective film-forming masses or materials. The invention is not limited to the proportions or other details stated herein. In said examples, the proportions are by weight.

*Example 1*

| | Per cent |
|---|---|
| T-type ethyl cellulose | 12 |
| Triphenyl phosphate | 1.0 |
| Dibutyl phthalate | 0.5 |
| Toluene | 66 |
| Alcohol S. D. #1 | 14 |
| Butyl acetate | 6.5 |
| | 100 |

The T-type ethyl cellulose has an ethoxy content of about 48%–50%. This ethoxy content may be varied, without departing from the invention.

The triphenyl phosate, $PO(OC_6H_5)_3$ is a colorless solid. It is used as a plasticizer for the ethyl cellulose.

The dibutyl phthalate, $C_6H_4(COOC_4H_9)_2$, is also a plasticizer for the ethyl cellulose. It is an oily liquid.

The butyl acetate is the normal butyl ester of acetic acid. Its formula is $CH_3COOC_4H_9$. It is a solvent for the ethyl cellulose.

The "alcohol S. D. #1" is industrial ethanol, of 95% strength, this proportion being by volume.

The above ingredients, in a uniform mixture, constitute the film-forming mass. This mass is applied to the free surface of the clay coating of the paper, on which the pre-formed marking has been printed. The method of casting the film, including the temperature of casting, etc., follows known practice. The film-forming mass can be applied and set at ordinary room temperature of 20° C.–25° C., and its solvent can be evaporated, in order to set the film-forming mass, at 20° C.–25° C.

Other formulas for the film-forming mass are as follows:

*Example 2*

| | Per cent |
|---|---|
| T-100 ethyl cellulose | 18 |
| Toluene | 54 |
| Alcohol S. D. #1 | 12.5 |
| Butyl acetate | 14 |
| Nevinol | 1.1 |
| Diphenylamine | 0.4 |
| | 100 |

The "T-100" ethyl cellulose designates ethyl cellulose whose ethoxy content is about 48%–50%, and which has a viscosity of 100 centipoises, when a 5% solution by weight of said ethyl cellulose is made in a solvent which consists of 80% of toluene and 20% of said industrial ethanol. The proportions of toluene and industrial ethanol are by volume. To make said test, the ethyl cellulose is thoroughly dried, in the well-known manner. In making the compositions disclosed herein with the use of ethyl cellulose, said ethyl cellulose can be thoroughly dried.

The "Nevinol" is a solution of polymerized paracoumarone-indene resin. This is a well-known product. It has a light straw color.

The diphenyl amine is also designated as phenylaniline, $(C_6H_5)_2NH$.

*Example 3*

| | Per cent |
|---|---|
| Cellulose acetate | 14 |
| Triphenyl phosphate | 3 |
| Acetone | 65 |
| Ethyl alcohol | 8 |
| Butyl alcohol | 6 |
| Triacetin | 4 |
| | 100 |

The butyl alcohol, $CH_3(CH_2)_2CH_2OH$, is normal butanol.

The triacetin, $C_3H_5(CO_2CH_3)_3$, is glyceryl triacetate.

*Example 4*

| | Per cent |
|---|---|
| Cellulose acetate | 14 |
| Acetone | 68 |
| Ethanol | 10 |
| Diethyl phthalate | 4 |
| Santicizer M-17 | 4 |
| | 100 |

Whenever I refer to the use of ethanol, I can use the aforesaid industrial ethanol.

The santicizer M-17, which is described on page 562 of the 1942 edition of "The Condensed Chemical Dictionary," published by Reinhold Publishing Company, is methyl phthalyl ethyl glycollate. It is a colorless liquid. The formula of diethyl phthalate is $C_6H_4(CO_2C_2H_5)_2$. It is a solvent and plasticizer for cellulose acetate.

The finished and set film or body is not injuriously affected by the transferred ink. That is, the ink can consist of a material which is the same as the material of the set body, or the material of the ink is compatible with the material of the set body. The ink can consist of a plurality of materials which are compatible with the material of the set body. The set body can consist of a plurality of materials. The ink can consist of materials which act as plasticizers or modifiers for the material or materials of the set body.

As an example of a suitable printing ink in which the coloring matter is a basic dye, which can be transferred to cellulose foils, after the solvent of said ink has evaporated, the following is stated:

*Example 5*

| | | |
|---|---|---|
| Acetone | cubic centimeters | 500 |
| Benzene | do | 500 |
| Ethanol | do | 2000 |
| Shellac | kilograms | 1500 |
| Victoria blue | per cent | 3 |
| Cellulose acetate | do | 1–3 |

Another type of ink, which is free from drying oils, is disclosed in British Patent No. 513,247.

I do not exclude the use of inks which contain oils, because numerous oils are compatible with cellulose derivatives, for example, in producing lacquers which dry to produce coherent films. Such compatible oils include raw castor oil, etc. The resins which can be used in the ink which is used for making the pre-formed marking include those which are used in the spirit varnish industry.

Of course it has been well known to make pre-formed markings with fusible marking compositions, upon a sheet of paper, and then to transfer said pre-formed markings by means of heat and pressure. According to my method, the ink is not fused, during the transfer of the marking.

It has also been well known to make decalcomania markings, and to transfer the same. However, such markings could not be transferred into the interior of a body which is made of film-forming material, especially if said material was a plastic. I transfer the pre-formed marking into the interior of the body, while said body is in non-set condition, and I then set the body.

The solution of the mass may penetrate the clay coating, although I prefer that there should be little or no penetration. The solvent of the solution of the mass may penetrate the clay coating sufficiently to dissolve all the ink of the marking. I prefer that the entire marking on the casting surface should be transferred in a single step, to a single film-forming mass. However, the marking on the casting surface may be sufficient to mark a plurality of bodies.

I can also use a casting surface which is made of metal, glass, etc., which has the desired marking in intaglio, and apply the film-forming mass to said pre-formed intaglio marking, thus eliminating the use of the paper casting member.

The prefered embodiment of my invention is to apply the film-forming mass, while it is uniformly intermixed with the ink-solvent, to a coated paper on which the pre-formed marking has been printed. This permits the transfer of intricate three-color and four-color designs. Likewise, since the solvent of the film-forming mass can be the same solvent which was used in the original marking ink, the use of a coated paper base enables the efficient transfer of the marking. The solvent of the film-forming base can consist partially of the solvent of the ink. Hence, the solvent of the film-forming composition can have the same penetration into the paper or clay casting surface, as the ink of the marking.

The paper base is not necessarily coated with clay, since other coating pigments and other coating materials have been used. The particles of such coating pigment are held in a solution of glue or casein or other adhesive. This coating composition is applied to the paper, excess solution is removed, the paper is dried, and the coating is burnished to a smooth surface. This type of coating is suitable for the reproduction of very fine lines, such as half-tone prints. The adhesive is preferably inert to the solvent of the film-forming mass, so that neither the paper nor its coating are affected by the casting and setting of the film-forming mass.

There is some intermixture of the marking composition of the pre-formed printed marking with the solute of the film-forming mass, when said marking is transferred wholly or partially into the interior of the film-forming mass. However, this does not result in any substantial distortion of the pre-formed marking. The set body is impervious to the marking composition, when said marking composition is in the undissolved state. It would ordinarily be expected that since the marking composition is dissolved in the solvent which is part of the film-forming mass, that the marking composition would spread laterally when it is absorbed in the film-forming mass, thus producing an imperfect representation of pictures which have fine lines. However, by using water-insoluble film-forming materials, and a thoroughly dry water-insoluble marking composition, which is preferably free from oil, an exact and accurate reproduction is produced in the interior of the set body.

The designation "film-forming" material is well-known as identifying material which is suitable for making thin films, as distinguished from paint and lacquer films which must be permanently supported on the rigid surface on which said paint and lacquer films are formed.

The ink or marking composition can consist of substances which are plasticizers or modifiers of the ethyl cellulose or cellulose acetate or other major ingredient of the set film or body. Hence, when I refer to the intermixture of the marking composition with the film-forming mass, I include such intermixture which is a physical or chemical combination of the ethyl cellulose or cellulose acetate or the like, with the marking composition, as though said marking composition were an original compatible ingredient of said marking composition. Such intermixture is localized, in order to secure the marking effect. The original solvent of the marking composition is preferably wholly or substantially evaporated, before the marking is transferred, but the invention is not limited to this feature.

In order conveniently to separate the finished set sheet from the paper sheet carrier, said paper sheet carrier can be thoroughly wetted with water. The wetted paper sheet can then be easily peeled off the finished set sheet.

Instead of using the usual casting machine, the film-forming mass can be made with a suitable low percentage of liquid ingredients, so that it is a spreadable paste. This paste can be spread uniformly under suitable applied pressure, as by means of a roller or other suitable device, upon the printed face of the coating of the paper or other carrier for the coating which has the printed impression. If desired, two or more layers of the film-forming mass can thus be mechanically applied in order to produce a film-forming mass of any desired thickness. This film-forming mass absorbs the printed impression, because it has enough solvent for this purpose. It is thus possible to produce a final set mass of substantial thickness and rigidity, in which the marking does not extend from one face of the set body to the opposed face thereof.

If desired, the finished set sheet or other body of plastic need not be separated from the paper carrier, which remains adhering to the set body, thus serving as a backing sheet. However, I prefer to soak the paper sheet in water for about 5-10 minutes, at ordinary room temperature of 20° C.–25° C., so that the paper sheet carrier can be easily stripped from the sheet of plastic.

A specimen of an article made according to my invention is annexed and made a part of this specification.

I have disclosed preferred embodiments of my invention, but numerous changes and additions and omissions can be made without departing from its scope.

I claim:

1. A method of making a marked body of film-forming material, which consists in casting a mass of a solution of said film-forming material against a casting layer, said casting layer being smooth and absorbent and consisting of solid particles which are connected by an adhesive which is inert to the solvent of said solution, said particles being also inert to said solvent, said casting layer having a marking which is at least partially absorbed in said casting layer, substantially all the ingredients of said marking being soluble in said solvent, maintaining said mass of solution in contact with said casting layer until sufficient of said marking has been dissolved in said solvent to form a duplicate thereof in said mass, and evaporating said solvent while said mass is maintained in contact with said casting layer until said mass has set into final form against said casting layer.

2. A method according to claim 1 in which said film-forming material is selected from a class which consists of cellulose ethers and cellulose esters, and said marking includes a substance selected from said class.

3. A method of making a marked body of film-forming material, which consists in casting a mass of a solution of said film-forming material against a casting layer, said casting layer being smooth and absorbent and consisting of solid particles which are connected by an adhesive which is inert to the solvent of said solution, said particles being also inert to said solvent, said casting layer having a dry and printed original marking which is transferable by said solvent from said casting layer by said solvent into said mass, at least part of said printed marking being absorbed in said casting layer, maintaining said mass of solution in contact with said casting layer until said original marking has been transferred by said solvent to form a transferred duplicate thereof in said mass, and evaporating said solvent while said mass is maintained in contact with said casting layer until said mass has set into final form against said casting layer.

JOSEPH MRAZEK.